April 24, 1962 A. N. GAGNON 3,031,544
AUTOMATIC BICYCLE STOP LIGHT SWITCH
Filed March 24, 1960
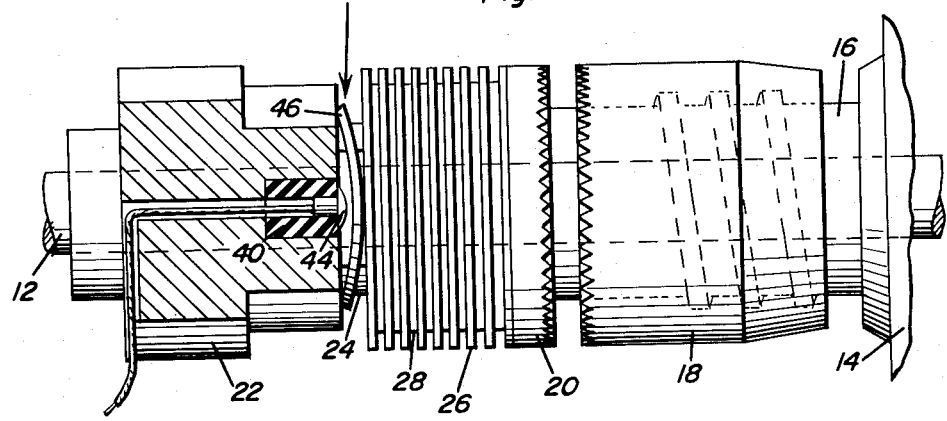
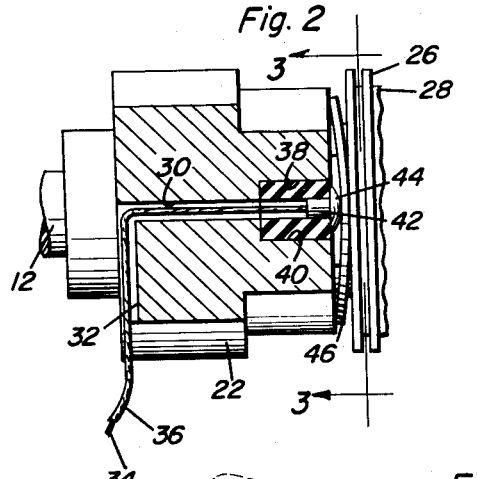
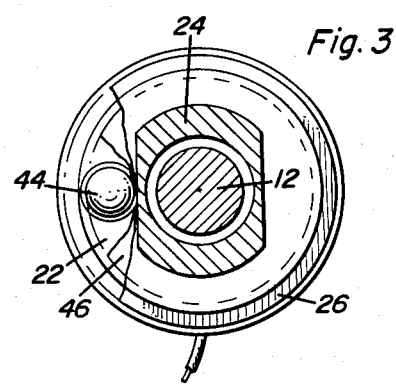
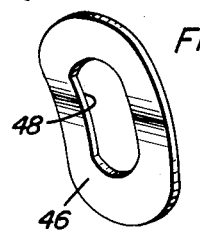
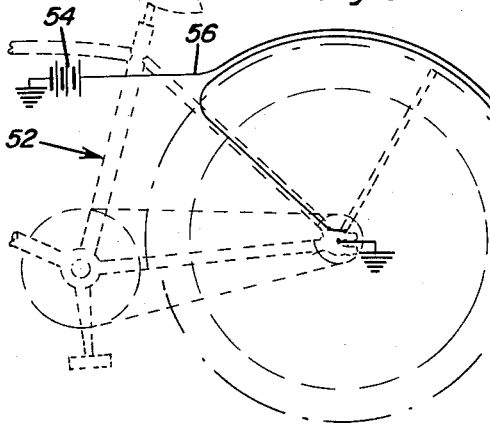
Alcide N. Gagnon
INVENTOR.

United States Patent Office 3,031,544
Patented Apr. 24, 1962

3,031,544
AUTOMATIC BICYCLE STOP LIGHT SWITCH
Alcide N. Gagnon, 83 Walnut Drive, Windsor, Conn.
Filed Mar. 24, 1960, Ser. No. 17,290
4 Claims. (Cl. 200—61.12)

The present invention generally relates to a signal device for use on bicycles and more particularly to a switch for actuating a stop light or signal light upon application of the bicycle brake to warn persons behind the bicycle that the brakes are being applied.

Previously, there have been attempts to provide a stop light switch for bicycles whereby a stop light or brake light will be actuated upon operation of the bicycle brakes. However, such devices have been relatively uneconomical in manufacture since they required considerable modification of the coaster brake with which most bicycles are usually provided. Therefore, it is the primary object of the present invention to provide a stop light switch which will automatically actuate the stop light or signal light upon application of the bicycle brake with the switch being incorporated into a conventional coaster brake with very little modification being required to the coaster brake thereby rendering the device economical in manufacture, simple in operation, dependable, long lasting and generally inexpensive to manufacture and install.

A further object of the present invention is to provide a stop light switch for a bicycle in which one component of the coaster brake is slightly modified by arcuately bowing the same and another component is modified by providing a passageway for an insulated electrical conductor having a contact on the inner end thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a coaster brake with the stop light switch of the present invention incorporated therein with portions being shown in section for illustrating the relationship thereof with the components being in relaxed position with the stop light switch being open;

FIGURE 2 is a view similar to FIGURE 1 but illustrating the relationship of components when the stop light switch is closed and the brake is applied;

FIGURE 3 is a transverse, sectional view taken substantially upon a plane passing along section line 3—3 of FIGURE 2 illustrating further structural details of the invention;

FIGURE 4 is a perspective view of the arcuately bowed spring forming a spring member which engages the contact; and FIGURE 5 is a schematic view of the installation of the stop switch on a bicycle.

Referring specifically to the drawings, the numeral 10 generally designates the stop light switch of the present invention with FIGURES 1 and 2 disclosing a coaster brake of a bicycle. Except for certain modifications described hereinafter, the coaster brake assembly is of conventional form and construction such as is illustrated in U.S. Patent Nos. 2,049,972 and 2,054,583.

For purposes of describing the invention, the coaster brake assembly includes a spindle 12 upon which is rotatably disposed the usual sprocket 14. The sprocket 14 is provided with a drive sleeve or worm 16 which is threadedly interengaged with a laterally shiftable clutch sleeve or driving nut 18. Disposed closely adjacent to but spaced normally from the clutch sleeve 18 is a brake clutch or brake actuator 20. Lateral movement of the clutch sleeve 18 will bring it into engagement with the brake actuator 20 in a manner well known and the braking action is accomplished by the usual brake anchor 22 rigid with the spindle 12 having a sleeve 24 rigid therewith which receives a plurality of disks 26 and 28 with alternate disks being locked to the hub and to the sleeve 24 in the usual manner. Thus as the brake actuator 20 moves towards the brake anchor 22, a substantial gripping force will be exerted by the disks thus providing a braking action. The structure so far described is conventional coaster brake structure as set forth in the preceding listed patents.

In modifying the coaster brake, the brake anchor 22 is provided with a passageway 30 adjacent one side thereof which terminates in a groove 32 in the outer end thereof for receiving an electric wire 34 having an insulation covering 36. The passageway 30 is provided with an inner countersunk portion 38 receiving an insulating sleeve or grommet 40. The insulating sleeve or grommet 40 receives a contact member 42 having a rounded contact head 44 thereon disposed exteriorly of the insulating sleeve 40 and the contact head 44 projects slightly beyond the inner surface of the brake anchor 22.

One of the brake disks 28 is concavo-convex or otherwise arcuately bowed and is designated by the numeral 46. The disk 46 is provided with a flat sided central opening 48 similar to the disk 28 for engagement with the sleeve 24. The concave side of the arcuately bowed disk spring 46 is facing the contact head 44 so that the spring disk 46 will normally be spaced from the contact head 44. However, when the brake is applied and the brake actuator 20 is moved laterally for applying pressure onto the disks 26 and 28 the disk spring 46 will be flattened out and come into engagement with the contact head 44 thus grounding and completing the circuit to a stop light 50 mounted on the rear of a bicycle structure generally designated by the numeral 52. The bicycle structure is provided with a battery 54 connected to the stop light 50 by a conductor 56 with the conductor 34 extending from the stop light to the stop light switch 10 so that the stop light switch will actually ground the circuit and complete the circuit back to the battery ground thus providing a complete circuit to energize the stop light 50 when the coaster brake is operated for applying lateral pressure to the disks 28 and 26 which is the usual manner of applying the brakes.

In operation, it will be apparent from the foregoing that when the rider of the bicycle causes the coaster brake to act for braking purposes, the sleeve 18 moves to the left thereby mechanically engaging the brake actuator 20 thus compressing the disk spring 46 and bringing it into contact with the contact head 44 thus closing the circuit to and accordingly energizing the stop light 50. Upon release of the brakes, the clutch sleeve 18 moves back to the right and the resiliency of the spring disk 46 will cause the spring disk to move away from the contact thus automatically breaking the circuit and deenergizing the stop light.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a coaster brake comprising a stationary spindle, a brake anchor rigid with the spindle, an axially shiftable member mounted on said spindle for movement towards and away from the brake anchor, and a group of friction disks interposed between the stationary brake anchor and the shiftable member for applying braking force to a hub enclosing the coaster brake when the shiftable member is moved towards the brake anchor, said brake anchor having a passageway therein receiving an electric conductor, a contact connected with the conductor and disposed inwardly of the brake anchor and insulated from the brake anchor, said conductor forming a part of a stop light circuit, one disk of said group, the disk which is disposed adjacent the brake anchor being arcuately bowed with the concave side thereof facing the contact and normally spaced away from the contact when the shiftable member is remote from the brake anchor thereby leaving the circuit for the stop light open, said arcuately bowed disk being straightened out to substantially a flat condition when the shiftable member is moved towards the brake anchor when applying the brakes thereby bringing the disk into contact with the contact on the electrical conductor for grounding the same thereby energizing the stop light by closing the circuit when the brake is applied.

2. The structure as defined in claim 1 wherein said brake anchor is provided with a countersunk portion in the inner end of the passageway receiving the electrical conductor, and an insulating sleeve enclosing the conductor and a portion of the contact disposed therein for insulating the contact and conductor from the brake anchor.

3. A stop light switch for bicycles having a coaster brake including a stationary contact member wired to and connected electrically to a stop light circuit, a spring metal friction disk embodied in and constituting a component part of the brake and spaced from the contact when the brake is relaxed thereby leaving the circuit open, said disk being concavo-convex when relaxed and being forcibly pressed and straightened to substantially a flat condition when the brake is applied, the concave surface of the disk facing the contact for engagement therewith when flattened thereby closing the circuit and energizing the stop light.

4. In combination with a coaster brake comprising a stationary spindle, a brake anchor rigid with the spindle, an axially shiftable member mounted on said spindle for movement towards and away from the brake anchor, and a group of friction disks interposed between the stationary brake anchor and the shiftable member for applying braking force to a hub enclosing the coaster brake when the shiftable member is moved towards the brake anchor, one of the disks in said group of friction disks, the one which is contiguous to and movable toward and from a cooperating surface of said brake anchor being concavo-convex with the concave side opposed to and normally spaced from said brake anchor, said brake anchor being provided with a socket, a sleeve of insulation material fitted into said socket, a conductor having a contact botton, said contact button being mounted in the bore of said insulating sleeve and positioned for cooperation with the concave side of said one disk.

References Cited in the file of this patent
UNITED STATES PATENTS

| | | |
|---|---|---|
| 2,079,153 | Cote | May 4, 1937 |
| 2,307,581 | French | Jan. 5, 1943 |